(12) United States Patent
McCluskey et al.

(10) Patent No.: US 10,680,895 B1
(45) Date of Patent: *Jun. 9, 2020

(54) METHOD AND SYSTEM FOR AUTOMATIC PATTERNS GENERATION AND TESTING

(71) Applicant: Intuit Inc., Mountain View, CA (US)

(72) Inventors: Sean McCluskey, Redwood City, CA (US); Amit Kalamkar, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/882,671

(22) Filed: Jan. 29, 2018

(51) Int. Cl.
| | |
|---|---|
| *H04L 29/06* | (2006.01) |
| *G06Q 40/00* | (2012.01) |
| *H04L 12/24* | (2006.01) |
| *H04L 29/08* | (2006.01) |
| *G06Q 40/02* | (2012.01) |

(52) U.S. Cl.
CPC ......... *H04L 41/0886* (2013.01); *G06Q 40/02* (2013.01); *G06Q 40/123* (2013.12); *H04L 63/1433* (2013.01); *H04L 63/20* (2013.01); *H04L 67/10* (2013.01)

(58) Field of Classification Search
CPC ... H04L 63/20; H04L 41/0846; H04L 41/085; H04L 41/28; H04L 63/1433; G06F 8/315–316; G06Q 40/123
See application file for complete search history.

(56) References Cited

U.S. PATENT DOCUMENTS

| | | | |
|---|---|---|---|
| 9,495,188 B1* | 11/2016 | Ettema | G06F 9/45533 |
| 10,002,058 B1* | 6/2018 | Shanmugam | G06F 11/2048 |
| 10,466,990 B1 | 11/2019 | McCluskey et al. | |
| 2012/0185821 A1* | 7/2012 | Yaseen | G06F 8/10 717/105 |
| 2016/0202962 A1 | 7/2016 | Arif et al. | |
| 2016/0241633 A1* | 8/2016 | Overby, Jr. | H04L 63/20 |
| 2017/0041347 A1* | 2/2017 | Nagaratnam | H04L 63/20 |
| 2019/0138288 A1 | 5/2019 | Brealey et al. | |

OTHER PUBLICATIONS

Ali et al., "Security in Cloud Computing: Opportunities and Challenges," Elsevier, Information Sciences 305, Feb. 7, 2015, pp. 357-383.

Fernandez et al., "Modeling and Security in Cloud Ecosystems," MDPI Open Access Journals, Future Internet 2016, vol. 8, No. 13, Apr. 20, 2016, pp. 1-15.

* cited by examiner

*Primary Examiner* — Aftab N. Khan
(74) *Attorney, Agent, or Firm* — Paradice and Li LLP (57) ABSTRACT

A method and system provides automatic patterns for implementing cloud based applications. The automatic patterns are extendable to make additional extended patterns. Extended patterns carry the characteristics of the patterns from which they were extended. Updating a base pattern with new security measures causes a cascade effect that updates all extended patterns that descend from the base pattern.

52 Claims, 4 Drawing Sheets

METHOD AND SYSTEM FOR AUTOMATIC PATTERNS GENERATION AND TESTING

BACKGROUND

Cloud computing service platforms have greatly enhanced the ability of software developers and organizations that develop software to acquire and manage computing resources. Cloud computing service platforms enable software developers to quickly and easily requisition processing, storage, and server resources in order to develop and deploy software-based services. For example, software development organizations can request specific configurations of processing, storage, and server resources from a cloud computing service platform and gain access nearly immediately to cloud-based virtual resources in accordance with the requested configurations.

Prior to the availability of cloud computing service platforms, when software development organizations and service providers needed computing resources for development and deployment of software services or applications, organizations would typically budget, plan, order, and physically install computing resources in physical locations owned or controlled by the software development organizations. The process of obtaining and deploying these resources could typically take several weeks or months to complete. Cloud computing service platforms have overcome many of these drawbacks by providing relatively inexpensive and substantially immediate access to whatever computing resources may be needed by software service providers. Accordingly, cloud service platform providers increase the capabilities and flexibility of software developers to develop and deploy software services.

However, in spite of the many advantages provided by cloud computing service platforms, cloud computing service platforms suffer from several drawbacks. For example, organizations that utilize cloud computing service platforms for development and deployment of complex software services often rely on multiple groups to each develop portions of software services or applications that will need to function together. As software developers attempt to combine their individual portions into a single functioning service, or into multiple cooperating services, many difficulties arise. Oftentimes, the various portions are initially incompatible with each other because they were not built using a single framework, configuration, or infrastructure. Large amounts of human and computing resources are utilized to make these various portions of developed software compatible with each other. Additionally, security problems arise when combining individual portions of developed software into a single functioning service. Individuals or teams that develop particular portions of services or applications each test their own particular portions separately to ensure that the portions meet security standards. Yet when the applications are combined, there are often security problems associated with the fact that the various software services or portions of software services were not developed using a single configuration or infrastructure. Again, large amounts of human and computing resources are utilized to ensure that the combination of the various portions or services together meet security standards.

Furthermore, once complex services or combinations of services are developed, it is often extremely difficult to develop services or applications that are extensions to these initially developed services or applications. The same problems of troubleshooting compatibility and security arise in the extension of services or applications, thereby requiring large amounts of human and computing resources to ensure compatibility of various portions of services or combinations of services as well as the security of these portions of services or combinations of services.

What is needed is a method and system that provide a technical solution to the technical problem of providing a framework that facilitates the efficient development, combination, and extension of software development and deployment tools.

SUMMARY

Embodiments of the present disclosure provide one or more technical solutions to the technical problem of providing a framework that facilitates the efficient development, combination, and extension of software development and deployment tools. Embodiments of the present disclosure generate a base pattern that defines a configuration of a base machine image that can be used as a building block to implement cloud based software applications and services. The base pattern is designed to be extendable to provide building blocks that are variations of the base pattern that operate within parameters fixed by the base pattern. Accordingly, embodiments of the present disclosure generate extended patterns that are extensions of the base pattern. The basic security and application standards of the base pattern are enforced in the extended patterns. Updating the security standards of the base pattern causes the security standards of all the extended patterns that descend from the base pattern to be updated as well. Software developers can develop software applications for the various patterns to provide machine images for providing cloud based software services. The base patterns and extended patterns provide an infrastructure by which developers can quickly and efficiently launch new applications. Groups of developers can each develop portions of an application using the infrastructure provided by the base pattern and its extensions, thereby ensuring compatibility and that security standards are met. In this way, embodiments of the present disclosure provide a technical solution to the technical problem of incompatible and disjointed development infrastructures.

Embodiments of the present disclosure address some of the shortcomings associated with traditional cloud based software application development and deployment schemes. Base patterns and extended patterns in accordance with principles of the present disclosure enable software developers to quickly and efficiently develop and deploy cloud based software applications and services. The various embodiments of the disclosure can be implemented to improve the technical fields of cloud computing, data processing, data transmission, and complex software architecture development. Therefore, the various described embodiments of the disclosure and their associated benefits amount to significantly more than an abstract idea. In particular, by providing extendable automatic base patterns, software development and deployment is significantly improved.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG. s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

Using the disclosed embodiments of a method and system for generating and testing automatic patterns, a method and system for generating and testing automatic patterns more accurately is provided. Therefore, the disclosed embodiments provide a technical solution to the long standing technical problem of efficiently and accurately developing and deploying complex software applications.

The disclosed embodiments of a method and system for generating and testing automatic patterns are also capable of dynamically adapting to constantly changing fields such as data managements systems. Consequently, the disclosed embodiments of a method and system for generating and testing automatic patterns also provide a technical solution to the long standing technical problem of static and inflexible data management systems.

The result is a much more accurate, adaptable, and robust method and system for generating and testing automatic patterns. This, in turn, results in: less human and processor resources being dedicated to developing, integrating, and testing software applications and portions of software application, i.e., usage of fewer processing resources, usage of fewer memory storage assets, and less communication bandwidth being utilized to transmit data for analysis.

The disclosed method and system for generating and testing automatic patterns does not encompass, embody, or preclude other forms of innovation in the area of complex software application development and integration. In addition, the disclosed method and system for generating and testing automatic patterns is not related to any fundamental economic practice, fundamental data processing practice, mental steps, or pen and paper based solutions, and is, in fact, directed to providing solutions to new and existing problems associated with complex software development environments. Consequently, the disclosed method and system for generating and testing automatic patterns, does not encompass, and is not merely, an abstract idea or concept.

Hardware Architecture

Figure 1:
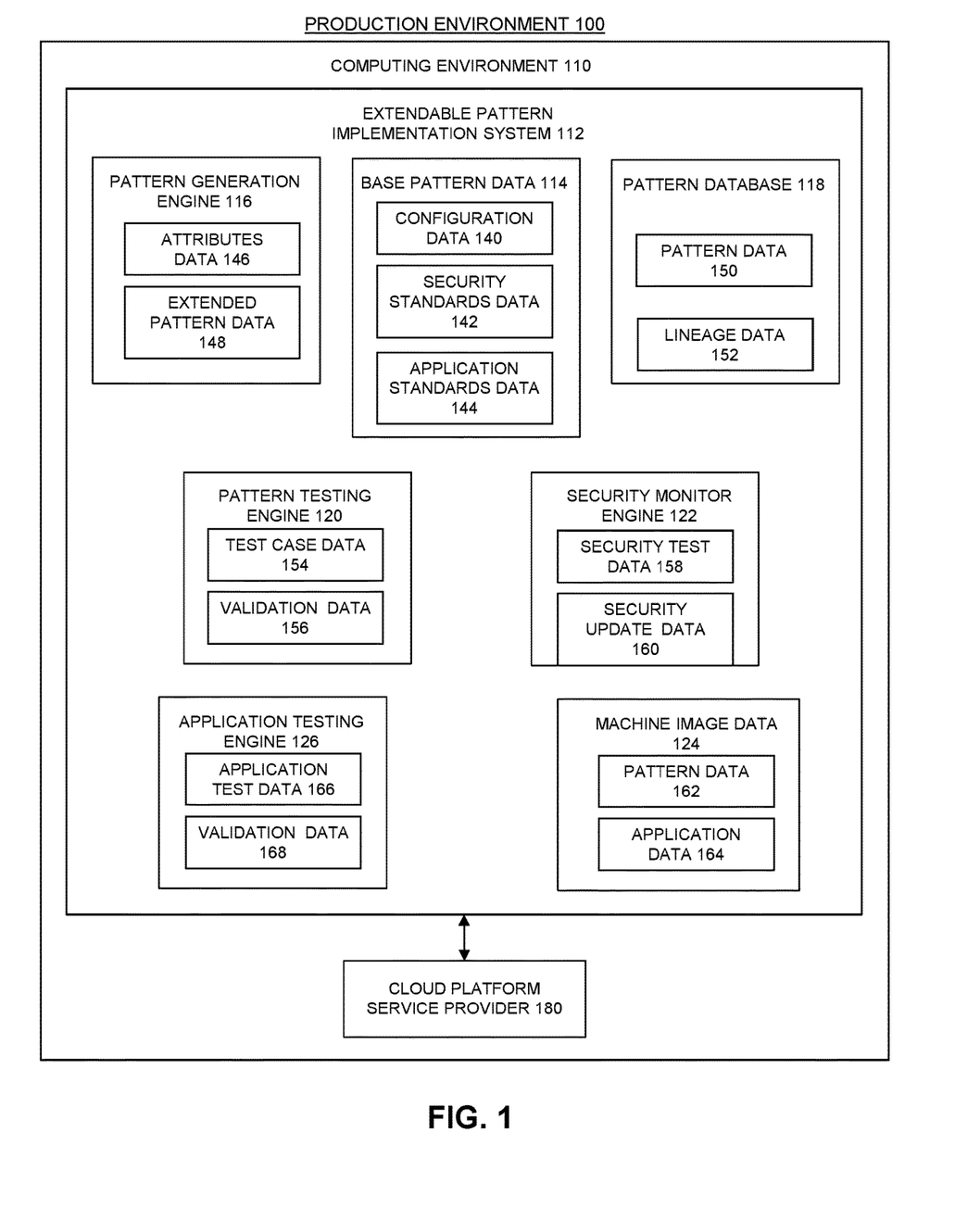
FIG. 1 is a block diagram of software architecture for generating and testing automatic patterns, in accordance with one embodiment.

FIG. 1 illustrates a block diagram of a production environment 100 for generating and testing automatic patterns, according to one embodiment. Embodiments of the present disclosure provide methods and systems for generating and testing automatic patterns, according to one embodiment. In particular, embodiments of the present disclosure provide a base pattern that is tested against configuration, validated, and checked against threat models and failure mode and effects analysis (FMEA). Once the base pattern has been verified, the base pattern can be used to launch a virtual machine using a machine image based on the base pattern. Additionally, the base pattern can be extended or combined with other patterns to form extended patterns within the framework of the base pattern. The extended patterns are tested and validated in the same manner as the base pattern. Once the extended patterns have been validated, the extended patterns can be used to launch virtual machines using machine images based on the extended patterns. Security standards and other standards of all extended patterns can be updated by merely updating the standards of the base pattern from which they descend.

In one embodiment, when a base pattern is extended, the proposed extended pattern is tested to ensure that the proposed extended pattern does not violate any configuration constraints or security rules associated with the base pattern. If the proposed extended pattern violates any of the configuration constraints or security rules associated with the base pattern, then the proposed extended pattern is not validated and will not be permitted. Accordingly, creation of the extended pattern will fail in these circumstances. If the extended pattern does not violate any of the configuration or security constraints, then creation and implementation of the extended pattern is permitted.

In one embodiment, testing and validation of the extended pattern occurs not only at creation of the extended pattern, but throughout the lifetime of the base pattern and all extended patterns. Each time an instance of the extended pattern is implemented, the extended pattern is validated again to ensure that the extended pattern complies with all constraints of the configuration and security standards of the base pattern, and any other rules associated with extending the base pattern. If an instance of an extended pattern fails this validation, the instance of the extended pattern will be prohibited until the extended pattern is compliant.

In addition, the disclosed method and system for generating and testing automatic patterns provides for significant improvements to the technical fields of complex software development, electronic transaction data security, data processing, and data management.

In addition, as discussed above, the disclosed method and system for generating and testing automatic patterns provides for the processing and storing of smaller amounts of data related to security systems, i.e., fewer security systems are needed and less effective security measures can be discarded; thereby eliminating unnecessary data analysis and storage. Consequently, using the disclosed method and system for generating and testing automatic patterns results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for generating and testing automatic patterns.

In one embodiment, the base pattern includes configuration data that identifies a configuration of virtual resources. The virtual resources include processing resources, storage resources, relational databases, and server resources, according to various embodiments. The virtual resources are building blocks that make up the base pattern. The base pattern combines different building blocks to provide the capabilities utilized by the types of applications for which the base pattern is designed. In one embodiment, the base pattern itself is a building block that is configured to be extended and combined with other patterns to form extended patterns.

In one embodiment, the base pattern and extended patterns introduce a development process that provides a development framework that extends the concept of building blocks into the application stack. The patterns provide virtual machines that include specifically selected web services. In one embodiment, the web services include web services such as Apache Tomcat, Nginx, Cassandra, Aurora database, or other web services.

In one embodiment, the patterns are configured for particular cloud platform providers. Examples of cloud platform providers whose services the patterns can utilize include Amazon Web services (AWS), Google cloud services, and Microsoft Azure. In the example of AWS, a basic or extended pattern may launch an instance of Elastic Compute Cloud (EC2) using an Amazon Machine Image (AMI) or Docker container.

In one embodiment, a single pattern implements an entire micro service. In one embodiment the micro service includes multiple instances of multiple different web services. The desired security profile for the entire micro service is built into the pattern. Developers implement their software applications on the infrastructure defined by the pattern.

In one embodiment, the pattern defines an infrastructure on which developers deploy applications. The pattern defines rails or limits prebuilt into the infrastructure so that the machine images not only go into production but are also the machinery that can test and deploy the application. Thus, in one embodiment, the pattern will test itself, deploy itself, and police itself based on its policies.

In one embodiment, the base pattern is extendable so that the base pattern can provide different kinds of variation by enabling extended patterns to be built from the base pattern in accordance with attributes selected by developers. In one embodiment, the extended patterns are automatically testable in order to ensure that whatever applications are produced with the extended patterns are already tested.

In one embodiment, the base pattern follows an open source model. The open source model enables other developers to contribute to the base pattern and to expand the base pattern. The base pattern is designed to encompass a large number of possible use cases through itself, and through extended patterns that are generated from the base pattern.

In one embodiment, the base pattern and extended patterns enable developers of complex applications and systems to have a common approach for application and system management and development. The basic and extended patterns define a common approach for the application stack. The basic and extended patterns effectively harmonize the infrastructure and build the infrastructure for developing and deploying applications. In one embodiment, an engineer can quickly stand up the shell of a micro service and input software inside of it. The software is tested and put in production much faster this way than in traditional systems.

In traditional complex software application development, multiple groups each automate their own portion of the application or service. The framework provided by the basic and extended patterns enables the automation itself to be automated.

In one embodiment, the base pattern is an application development building block. A developer may want a different kind of building block than the building block defined by the base pattern. The base pattern includes attributes that make the base pattern extendable so that the developer can generate an extended pattern from the base pattern and having different attributes than the base pattern that, nevertheless, to within the extendable framework of the base pattern.

In one embodiment, extended patterns are tested to ensure that the extended patterns have the desired attributes. If the extended patterns have the desired attributes and do not violate standards set by the base pattern, then the extended pattern is valid. The extended pattern is then ready to be implemented to launch one or more machine images or micro services.

In one embodiment, the base pattern defines an infrastructure built from multiple machine images. The infrastructure is preloaded with everything that is needed to launch applications. Extended patterns are generated from the base pattern according to the unique needs of each development team. All of this is pre-validated, deployed, and validated again. In this way the base patterns and extended patterns provide an entire computing infrastructure.

In one embodiment, the base pattern includes an operating system. However, in one embodiment, may use different operating systems from each other, or multiple operating systems. In one embodiment, the base pattern is designed to provide the multiple operating systems that may be used by development teams. The base pattern has gone through the designated systems development lifecycle (SDLC) and so the various included operating systems are officially sanctioned by the base pattern. In one embodiment extended patterns are generated from the base pattern identifying other operating systems and web services that can be used.

In one embodiment, all of the extended patterns keep the lineage of the patterns from which they are extended. In one embodiment, the extended pattern is an extension of an extended pattern which is in turn an extension of two base patterns. Each extended pattern maintains the lineage of the patterns from which it is extended. In this way, if one or more extended patterns need to be changed, developers can make the change in the base pattern and the change will cascade into all extended patterns. If a security update is needed in multiple patterns, the security update can be applied to the base pattern, and the security update will propagate to the extended patterns that extend from the base pattern. For additional security, developers can also forensically check the security of the basic and extended patterns.

In one embodiment, the base pattern is an image specification based on multiple sets of standards. A first set of standards includes best practices for working with particular operating systems or web services specified by the base pattern. The first of the standards can also include standards for operating with third parties. A second set of standards includes security standards that define security protocols for the base pattern and for any possible extended patterns. A third set of standards includes application specific standards the define standards related to specific kinds of applications expected to be implemented with the base pattern or with extended patterns based on the base pattern.

In one embodiment, the security standards help to ensure that the base pattern and any extensions from the base pattern are up-to-date. The security standards ensure that the base pattern is dispatched with the most current security standards as security standards are changed. For example, if the base pattern enables the use of a particular operating system and the new version of the operating system is released including additional security standards or patches, then the base pattern patches itself up to the latest security standards and insures that any of the extended patterns in its lineage are also updated to the latest security standards.

Traditional security practices typically focus on auditing the production environment. However, the extendable pattern implementation system according to one embodiment ensures that the base pattern and the extended patterns will enforce proper security on any application or service that is implemented using the base pattern or extended patterns. In this way, all applications and services that are implemented using a base pattern or any extended patterns will automatically implement the latest security standards via the lineage because the base pattern is constantly updated to acquire the latest security standards.

In one embodiment, the base pattern is a master pattern. The base pattern allows for variation within limits specified in the base pattern.

In one embodiment, patterns can be combined with other patterns to form compounds patterns.

In one embodiment, a test engine automatically writes test cases to test a base pattern when the base pattern is developed. In one embodiment, the test engine automatically rights test cases to test and extended pattern when an extended pattern is developed from the base pattern. The test cases ensure that whatever has been done either in the base pattern or in the extended pattern is valid in accordance with the standards that we want to apply.

The production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the computing environment 110 includes an extendable pattern implementation system 112. The extendable pattern implementation system 112 includes base pattern data 114, a pattern generation engine 116, a pattern database 118, pattern testing engine 120, a security monitor engine 122, machine image data 124, and an application testing engine 126, according to various embodiments.

In one embodiment, the base pattern data 114 defines a base pattern. The base pattern is a modular pattern that can be automatically extended, automatically tested against configuration, validated, and checked against threat models and FMEA. Once the base pattern has been verified, the base pattern is used to launch an instance of a cloud-based virtual machine using a machine image or container. The base pattern is extendable and combinable with other patterns to create extended patterns and compound patterns.

In one embodiment, the base pattern data 114 includes configuration data 140. The configuration data 140 defines a configuration of virtual assets such as computing assets, storage assets, database assets, server assets, web service assets, and operating system assets. The base pattern is generated, based, in part, on the configuration data 140.

In one embodiment, the base pattern data 114 includes security standards data 142. The security standards data 142 defines a set of security standards for the base pattern and for extended patterns generated from the base pattern. The base pattern is generated based, in part, on the security standards data 142.

In one embodiment, the base pattern data 114 includes application standards data 144. The application standards data 144 includes application specific standards. The application specific standards include standards specific to applications or types of applications expected to be implemented with a machine image based on the base pattern. The base pattern data 114 is generated based, in part, on the application standards data 114.

In one embodiment, the pattern generation engine 116 is used to generate extended patterns from the base pattern 114. The extended patterns correspond to variations of the base pattern. If a developer desires a variation of the base pattern, the pattern generation engine 116 generates an extended pattern including the desired variation from the base pattern. In one embodiment, the pattern generation engine is an automatic pattern generation engine that automatically generates an extended pattern from a base pattern when attribute data is provided to the automatic pattern generation engine.

In one embodiment, the pattern generation engine receives attributes data 146. The attributes data 146 corresponds to desired attributes of an extended pattern to be generated from the base pattern. The attributes data 146 defines the ways in which the extended pattern will vary from the base pattern.

In one embodiment, the pattern generation engine 116 generates extended pattern data 148 based on the attributes data 146 and the base pattern data 114. The extended pattern data 148 defines an extended pattern that is an extension of the base pattern defined by the base pattern data 114. The extended pattern includes attributes based on the attribute data 146. The attributes define ways in which the extended pattern varies from the base pattern.

In one embodiment, the extendable pattern implementation system 112 includes rules for enabling or denying creation of an extended pattern. These rules indicate that if an extended pattern violates configuration constraints or security standards of the base pattern, then the extended pattern will not be created. When a base pattern is extended, the proposed extended pattern is tested to ensure that the proposed extended pattern does not violate any configuration constraints or security rules associated with the base pattern. If the proposed extended pattern violates any of the configuration constraints or security rules associated with the base pattern, then the proposed extended pattern is not validated and will not be permitted. Accordingly, creation of the extended pattern will fail in these circumstances. If the extended pattern does not violate any of the configuration or security constraints, then creation and implementation of the extended pattern is permitted.

In one example, in accordance with one embodiment, the security standards of the base pattern indicate that a particular port is not allowed to be opened. If a user attempts to create an extended pattern that opens this port, the rules of the extendable pattern implementation system 112 will prevent creation of the extended pattern until the extended pattern conforms to the configuration and security standards of the base pattern.

In one example, in accordance with one embodiment, the configuration constraints of the base pattern indicate that a particular aspect of the configuration data of the base pattern is not allowed to be changed in an extended pattern. If a user attempts to create an extended pattern that changes this aspect of the configuration data of the base pattern, the rules of the extendable pattern implementation system 112 will prevent creation of the extended pattern until the extended pattern conforms to the configuration and security standards of the base pattern.

In one embodiment, the testing for compliance with the rules occurs not only at creation of the extended pattern, but throughout the lifetime of the base pattern and all extended patterns. Each time an instance of the extended pattern is implemented, and while the instance of the extended pattern is running, the extended pattern is validated again to ensure that the extended pattern complies with all constraints of the configuration and security standards of the base pattern, and any other rules associated with extending the base pattern. If an instance of an extended pattern fails this validation, the instance of the extended pattern will be prohibited until the extended pattern is compliant.

In one embodiment, the pattern database 118 is a database or library of patterns generated with the extendable pattern implementation system 112. The pattern database 118 includes pattern data 150. The pattern data 150 identifies all of the base patterns and all of the extended patterns generated with the extendable pattern implementation system 112. Developers have access to the basic and extended patterns in order to generate other extended patterns or to populate a basic or extended pattern with software instructions for an application in order to generate a machine image for launching a virtual machine to implement the application.

In one embodiment, the pattern database 118 includes lineage data 152. The lineage data 152 identifies the relationships of each of the patterns stored in the pattern data 150. In one embodiment, the base pattern may have a large tree of extended patterns that are extensions of the base pattern. The lineage data 152 identifies for every base pattern all of the extended patterns that extend therefrom. The lineage data 152 identifies, for each extended pattern, which other extended patterns the extended pattern is generated from. The lineage data 152 also identifies, for each extended pattern, which other extended patterns are extensions of the extended pattern. Thus, in one embodiment, the lineage data 152 defines a lineage tree for the base patterns and extended patterns stored in the pattern data 150.

In one embodiment, the pattern database 118 is utilized to implement launch and re-stack capabilities for the basic and extended patterns included in the pattern data 150. In one embodiment, the extendable pattern implementation system 112 automatically updates security features and other features of the base patterns and extended patterns. When security standards need to be updated, the extendable pattern implementation system 112 updates the security standards for a base pattern included in the pattern data 150. The lineage data 152 causes the security standard to automatically be propagated into every extended pattern that descends from the base pattern that receives the security update. In this way, the extendable pattern implementation system 112 restacks the base pattern and any extended patterns that extend from the base pattern. The extendable pattern implementation system 112 automatically relaunches in the active virtual machines based on machine images derived from the newly re-stacked base pattern and extended patterns, according to one embodiment.

In one embodiment, the extendable pattern implementation system 112 includes the pattern testing engine 120. The pattern testing engine 120 is configured to automatically test any base patterns or extended patterns that are newly generated or newly updated. In this way, all base patterns and extended patterns are automatically tested and validated each time a new pattern is generated for each time a pattern is updated.

In one embodiment, the pattern testing engine 120 generates test case data 154 for each newly generated or newly updated pattern. The test case data 154 includes test cases for each pattern to be tested. The pattern testing engine 120 then tests the validity of the patterns based on the test case data 154, according to one embodiment.

In one embodiment, when the pattern testing engine 120 tests a base or extended pattern based on the test case data 154, the pattern testing engine 120 generates validation data 156. The validation data 156 identifies whether the base or extended pattern is valid and compliant. If the validation data 156 indicates that the base or extended pattern is not valid for compliant, then the base or extended pattern is not generated or updated. If the validation data 156 indicates that the base or extended pattern is valid and compliant, then the base or extended pattern is generated or updated and sanctioned and is available for use.

In one embodiment, the security monitor engine 122 monitors the security of the base and extended patterns and any machine images and virtual machines implemented from the base and extended patterns. In one embodiment, the security monitor engine 122 continuously tests whether the security parameters and standards of the base and extended patterns and any machine images and virtual machines implemented from the base of extended patterns are up-to-date. The security monitor engine 122 to generate security test data 158 indicating whether or not security standards are met.

In one embodiment, the security monitor engine 122 checks for security updates that need to be applied to the base and extended patterns. The security monitor engine 122 generates security update data 160 indicating whether any security updates are available to apply to the base and extended patterns. The security monitor engine 122 applies any needed security updates to the base patterns, and the security updates are then propagated to the extended patterns from the base pattern.

In one embodiment, the extendable pattern implementation system 112 includes machine image data 124. The machine image data 124 corresponds to machine images generated from the base or extended patterns. In one embodiment, the machine images correspond to Amazon Machine Images. In one embodiment, the machine images correspond to Docker containers. Additionally, or alternatively, the machine images include other kinds of machine images known to those of skill in the art at the time of filing or in the future.

In one embodiment, the machine image data 124 includes pattern data 162. The pattern data 162 corresponds to the base or extended image from which a pattern is generated. As each machine image is based on a base or extended pattern, the pattern data 162 identifies which base or extended pattern the machine image is based on.

In one embodiment, the machine image data 124 includes application data 164. The application data 164 corresponds to a software application developed for implementation in accordance with one of the base or extended patterns. The machine images are used to launch virtual machines that implement the applications, according to one embodiment.

In one embodiment, the application testing engine 126 is configured to test the application data 164. The application testing engine 126 tests the application data 164 to ensure that the applications are compatible with the standards of the base and extended patterns in which they will be implemented. The applications that meet the standards can be implemented. The applications that do not meet the standards will not be implemented.

In one embodiment, the application testing engine 126 generates application test data 166 in order to test the application data 164. In one embodiment, the application testing engine 126 generates validation data 168 indicating whether or not the application data 164 corresponding to an application is compliant and valid.

In one embodiment, the extendable pattern implementation system 112 interfaces with a cloud platform service provider 180. The cloud platform service provider 180 provides the virtual resources utilized when a virtual machine is launched from the machine image data, according to one embodiment.

Process

Figure 2:
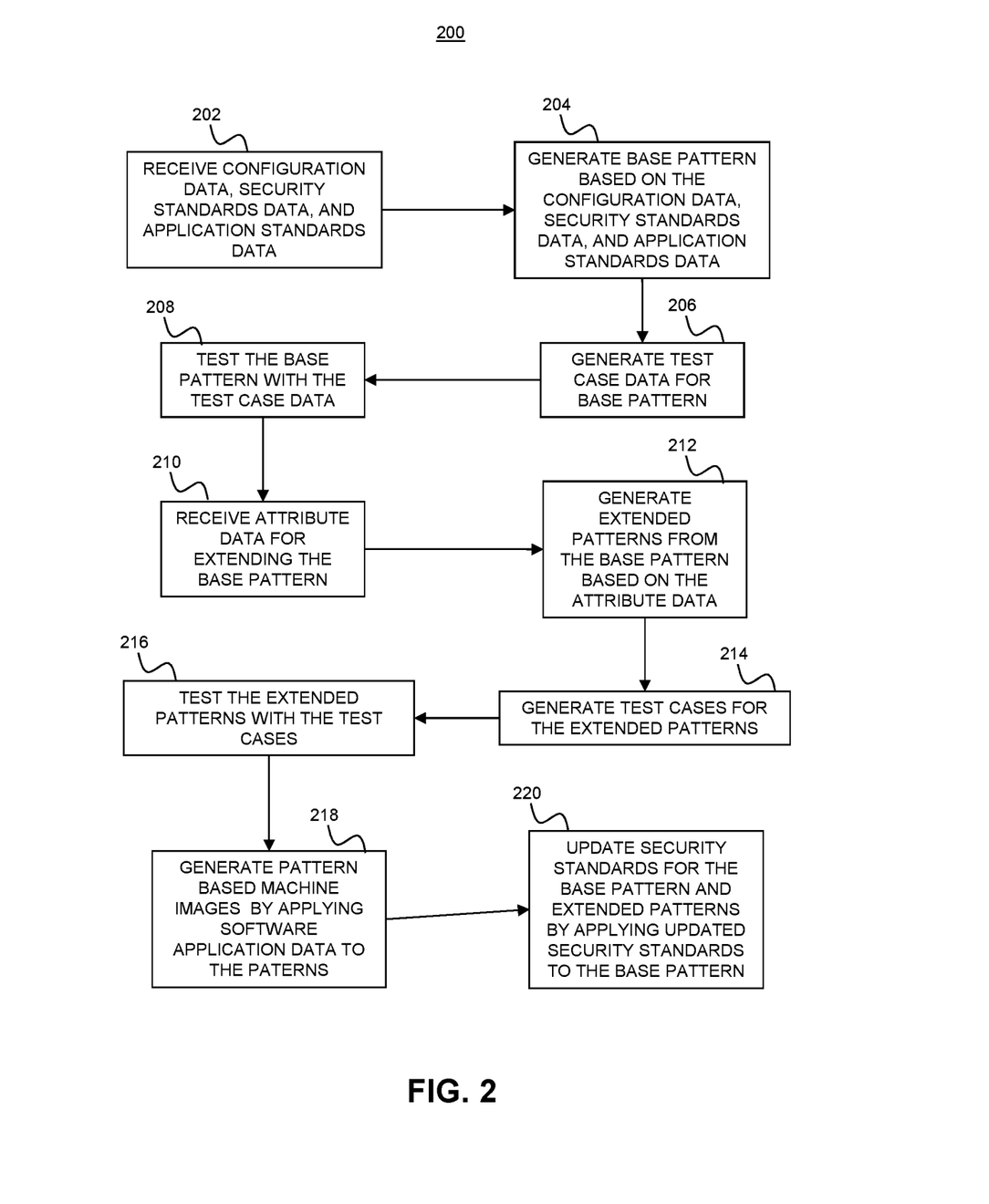
FIG. 2 is a block diagram of a process for generating and testing automatic patterns, in accordance with one embodiment.

FIG. 2 illustrates a functional flow diagram of a process 200 for generating and testing automatic patterns, in accordance with one embodiment.

Referring to FIG. 2, FIG. 1, and the description of FIG. 1 above, at block 202 configuration data, security standards data, and application standards data are received using any of the methods, processes, and procedures discussed above with respect to FIG. 1, according to one embodiment. From block 202 the process proceeds to block 204.

At block 204 a base pattern was generated based on the configuration data, the security standards data, and the application standards data, using any of the methods, processes, and procedures discussed above with respect to FIG. 1, according to one embodiment. From block 204 the process proceeds to block 206.

At block 206 test case data is generated for the base pattern, using any of the methods, processes, and procedures discussed above with respect to FIG. 1, according to one embodiment. From block 206 the process proceeds to block 208.

At block 208, the base pattern is tested with the test case data, using any of the methods, processes, and procedures discussed above with respect to FIG. 1, according to one embodiment. From block 208 the process proceeds to block 210.

At block 210 attribute data is received for extending the base pattern, using any of the methods, processes, and procedures discussed above with respect to FIG. 1, according to one embodiment. From block 210 the process proceeds to block 212.

At block 212 extended patterns are generated from the base pattern based on the attribute data, using any of the methods, processes, and procedures discussed above with respect to FIG. 1, according to one embodiment. From block 212 the process proceeds to block 214.

At block 214 test cases are generated for the extended patterns, using any of the methods, processes, and procedures discussed above with respect to FIG. 1, according to one embodiment. From block 214 the process proceeds to block 216.

At block 216 the extended patterns are tested with the test cases, using any of the methods, processes, and procedures discussed above with respect to FIG. 1, according to one embodiment. From block 216 the process proceeds to block 218.

At block 218 pattern-based machine images are generated by applying software application data to the patterns, using any of the methods, processes, and procedures discussed above with respect to FIG. 1, according to one embodiment. From block 218 the process proceeds to block 220.

At block 220 security standards are updated for the base pattern and the extended patterns by applying updated security standards to the base pattern, using any of the methods, processes, and procedures discussed above with respect to FIG. 1, according to one embodiment.

Those of skill in the art will recognize, in light of the present disclosure, that the process 200 can include different steps, different orders of steps, other than those represented in FIG. 2. All such other processes fall within the scope of the present disclosure.

Figure 3:
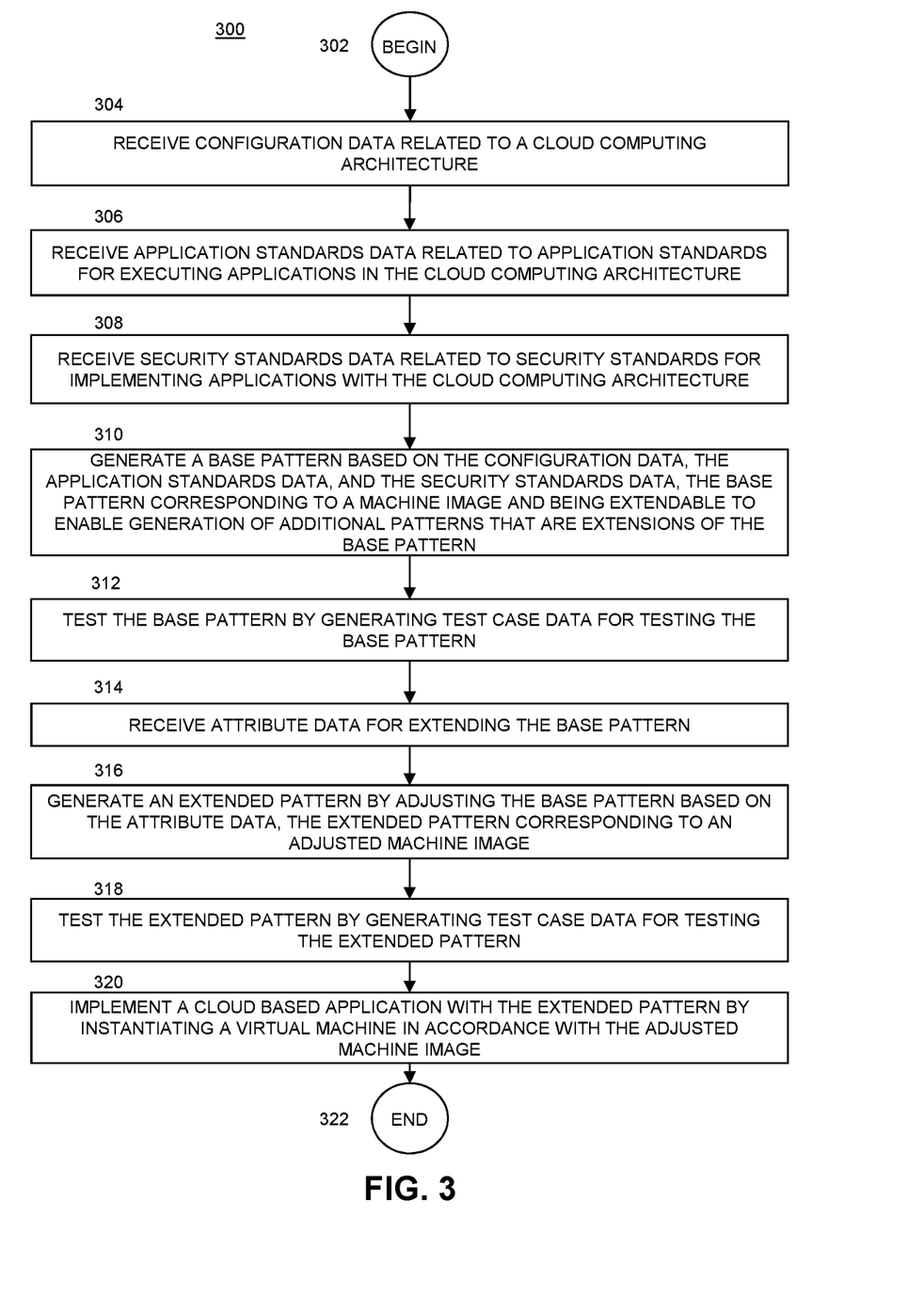
FIG. 3 is a flow diagram of a process for generating and testing automatic patterns, in accordance with one embodiment.

FIG. 3 illustrates a flow diagram of a process 300 for generating and testing automatic patterns, according to various embodiments.

Referring to FIGS. 1-3, and the description of FIGS. 1-2 above, in one embodiment, process 300 begins at BEGIN 302 and process flow proceeds to RECEIVE CONFIGURATION DATA RELATED TO A CLOUD COMPUTING ARCHITECTURE 304.

In one embodiment, at RECEIVE CONFIGURATION DATA RELATED TO A CLOUD COMPUTING ARCHITECTURE 304, configuration data is received related to a cloud computing architecture, using any of the methods, processes, and procedures discussed above with respect to FIGS. 1-2.

In one embodiment, once configuration data is received related to a cloud computing architecture at RECEIVE CONFIGURATION DATA RELATED TO A CLOUD COMPUTING ARCHITECTURE 304 process flow proceeds to RECEIVE APPLICATION STANDARDS DATA RELATED TO APPLICATION STANDARDS FOR EXECUTING APPLICATIONS IN THE CLOUD COMPUTING ARCHITECTURE 306.

In one embodiment, at RECEIVE APPLICATION STANDARDS DATA RELATED TO APPLICATION STANDARDS FOR EXECUTING APPLICATIONS IN THE CLOUD COMPUTING ARCHITECTURE 306, application standards data is received related to application standards for executing applications in the cloud computing architecture, using any of the methods, processes, and procedures discussed above with respect to FIGS. 1-2.

In one embodiment, once application standards data is received related to application standards for executing applications in the cloud computing architecture at RECEIVE APPLICATION STANDARDS DATA RELATED TO APPLICATION STANDARDS FOR EXECUTING APPLICATIONS IN THE CLOUD COMPUTING ARCHITECTURE 306, process flow proceeds to RECEIVE SECURITY STANDARDS DATA RELATED TO SECURITY STANDARDS FOR IMPLEMENTING APPLICATIONS WITH THE CLOUD COMPUTING ARCHITECTURE 308.

In one embodiment, at RECEIVE SECURITY STANDARDS DATA RELATED TO SECURITY STANDARDS FOR IMPLEMENTING APPLICATIONS WITH THE CLOUD COMPUTING ARCHITECTURE 308, security standards data is received related to security standards for implementing applications with the cloud computing architecture, using any of the methods, processes, and procedures discussed above with respect to FIGS. 1-2.

In one embodiment, once security standards data is received related to security standards for implementing applications with the cloud computing architecture at RECEIVE SECURITY STANDARDS DATA RELATED TO SECURITY STANDARDS FOR IMPLEMENTING APPLICATIONS WITH THE CLOUD COMPUTING ARCHITECTURE 308, process flow proceeds to GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 310.

In one embodiment, at GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 310, a base pattern is generated based on the configuration data, the application standards data, and the security standards data, the base pattern corresponding to a machine image and being extendable to enable generation of additional patterns that are extensions of the base pattern, using any of the methods, processes, and procedures discussed above with respect to FIGS. 1-2.

In one embodiment, once a base pattern is generated based on the configuration data, the application standards data, and the security standards data, the base pattern corresponding to a machine image and being extendable to enable generation of additional patterns that are extensions of the base pattern at GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 310, process flow proceeds to TEST THE BASE PATTERN BY GENERATING TEST CASE DATA FOR TESTING THE BASE PATTERN 312.

In one embodiment, at TEST THE BASE PATTERN BY GENERATING TEST CASE DATA FOR TESTING THE BASE PATTERN 312, the base pattern is tested by generating test case data for testing the base pattern, using any of the methods, processes, and procedures discussed above with respect to FIGS. 1-2.

In one embodiment, once the base pattern is tested by generating test case data for testing the base pattern at TEST THE BASE PATTERN BY GENERATING TEST CASE DATA FOR TESTING THE BASE PATTERN 312, process flow proceeds to RECEIVE ATTRIBUTE DATA FOR EXTENDING THE BASE PATTERN 314.

In one embodiment, at RECEIVE ATTRIBUTE DATA FOR EXTENDING THE BASE PATTERN 314, attribute data is received for extending the base pattern, using any of the methods, processes, and procedures discussed above with respect to FIGS. 1-2.

In one embodiment, once attribute data is received for extending the base pattern at RECEIVE ATTRIBUTE DATA FOR EXTENDING THE BASE PATTERN 314, process flow proceeds to GENERATE AN EXTENDED PATTERN BY ADJUSTING THE BASE PATTERN BASED ON THE ATTRIBUTE DATA, THE EXTENDED PATTERN CORRESPONDING TO AN ADJUSTED MACHINE IMAGE 316.

In one embodiment, at GENERATE AN EXTENDED PATTERN BY ADJUSTING THE BASE PATTERN BASED ON THE ATTRIBUTE DATA, THE EXTENDED PATTERN CORRESPONDING TO AN ADJUSTED MACHINE IMAGE 316, an extended pattern is generated by adjusting the base pattern based on the attribute data, the extended pattern corresponding to an adjusted machine image, using any of the methods, processes, and procedures discussed above with respect to FIGS. 1-2.

In one embodiment, once an extended pattern is generated by adjusting the base pattern based on the attribute data, the extended pattern corresponding to an adjusted machine image at GENERATE AN EXTENDED PATTERN BY ADJUSTING THE BASE PATTERN BASED ON THE ATTRIBUTE DATA, THE EXTENDED PATTERN CORRESPONDING TO AN ADJUSTED MACHINE IMAGE 316, process flow proceeds to TEST THE EXTENDED PATTERN BY GENERATING TEST CASE DATA FOR TESTING THE EXTENDED PATTERN 318.

In one embodiment, at TEST THE EXTENDED PATTERN BY GENERATING TEST CASE DATA FOR TESTING THE EXTENDED PATTERN 318 the extended pattern is tested by generating test case data for testing the extended pattern, using any of the methods, processes, and procedures discussed above with respect to FIGS. 1-2.

In one embodiment, once the extended pattern is tested by generating test case data for testing the extended pattern at IMPLEMENT A CLOUD BASED APPLICATION WITH THE EXTENDED PATTERN BY INSTANTIATING A VIRTUAL MACHINE IN ACCORDANCE WITH THE ADJUSTED MACHINE IMAGE 320.

In one embodiment, at IMPLEMENT A CLOUD BASED APPLICATION WITH THE EXTENDED PATTERN BY INSTANTIATING A VIRTUAL MACHINE IN ACCORDANCE WITH THE ADJUSTED MACHINE IMAGE 320 a cloud based application is implemented with the extended pattern by instantiating a virtual machine in accordance with the adjusted machine image, using any of the methods, processes, and procedures discussed above with respect to FIGS. 1-2.

In one embodiment, once a cloud based application is implemented with the extended pattern by instantiating a virtual machine in accordance with the adjusted machine image at IMPLEMENT A CLOUD BASED APPLICATION WITH THE EXTENDED PATTERN BY INSTANTIATING A VIRTUAL MACHINE IN ACCORDANCE WITH THE ADJUSTED MACHINE IMAGE 320, process flow proceeds to END 322.

In one embodiment, at END 322 the process for generating and testing automatic patterns is exited to await new data and/or instructions.

Figure 4:
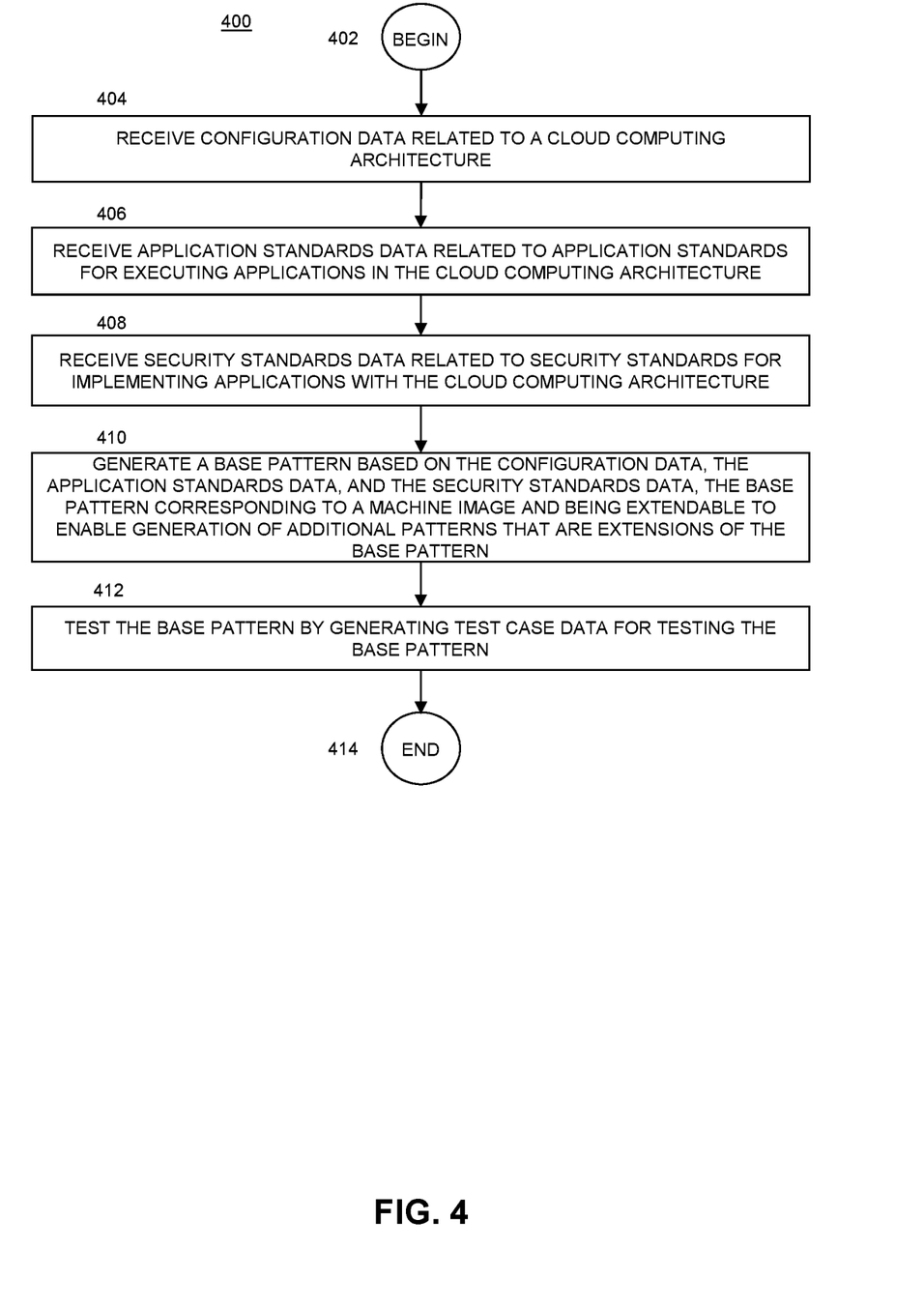
FIG. 4 is a flow diagram of a process for generating and testing automatic patterns, in accordance with one embodiment.

FIG. 4 illustrates a flow diagram of a process 400 for generating and testing automatic patterns, according to various embodiments.

Referring to FIG. 4, FIGS. 1-2, and the description of FIGS. 1-2 above, in one embodiment, process 400 begins at BEGIN 402 and process flow proceeds to RECEIVE CONFIGURATION DATA RELATED TO A CLOUD COMPUTING ARCHITECTURE 404.

In one embodiment, at RECEIVE CONFIGURATION DATA RELATED TO A CLOUD COMPUTING ARCHITECTURE 404, configuration data is received related to a cloud computing architecture, using any of the methods, processes, and procedures discussed above with respect to FIGS. 1-2.

In one embodiment, once configuration data is received related to a cloud computing architecture at RECEIVE CONFIGURATION DATA RELATED TO A CLOUD COMPUTING ARCHITECTURE 404 process flow proceeds to RECEIVE APPLICATION STANDARDS DATA RELATED TO APPLICATION STANDARDS FOR EXECUTING APPLICATIONS IN THE CLOUD COMPUTING ARCHITECTURE 406.

In one embodiment, at RECEIVE APPLICATION STANDARDS DATA RELATED TO APPLICATION STANDARDS FOR EXECUTING APPLICATIONS IN THE CLOUD COMPUTING ARCHITECTURE 406, application standards data is received related to application standards for executing applications in the cloud computing architecture, using any of the methods, processes, and procedures discussed above with respect to FIGS. 1-2.

In one embodiment, once application standards data is received related to application standards for executing applications in the cloud computing architecture at RECEIVE APPLICATION STANDARDS DATA RELATED TO APPLICATION STANDARDS FOR EXECUTING APPLICATIONS IN THE CLOUD COMPUTING ARCHITECTURE 406, process flow proceeds to RECEIVE SECURITY STANDARDS DATA RELATED TO SECURITY STANDARDS FOR IMPLEMENTING APPLICATIONS WITH THE CLOUD COMPUTING ARCHITECTURE 408.

In one embodiment, at RECEIVE SECURITY STANDARDS DATA RELATED TO SECURITY STANDARDS FOR IMPLEMENTING APPLICATIONS WITH THE CLOUD COMPUTING ARCHITECTURE 408, security standards data is received related to security standards for implementing applications with the cloud computing architecture, using any of the methods, processes, and procedures discussed above with respect to FIGS. 1-2.

In one embodiment, once security standards data is received related to security standards for implementing applications with the cloud computing architecture at RECEIVE SECURITY STANDARDS DATA RELATED TO SECURITY STANDARDS FOR IMPLEMENTING APPLICATIONS WITH THE CLOUD COMPUTING ARCHITECTURE 408, process flow proceeds to GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 410.

In one embodiment, at GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 410, a base pattern is generated based on the configuration data, the application standards data, and the security standards data, the base pattern corresponding to a machine image and being extendable to enable generation of additional patterns that are extensions of the base pattern, using any of the methods, processes, and procedures discussed above with respect to FIGS. 1-2.

In one embodiment, once a base pattern is generated based on the configuration data, the application standards data, and the security standards data, the base pattern corresponding to a machine image and being extendable to enable generation of additional patterns that are extensions of the base pattern at GENERATE A BASE PATTERN BASED ON THE CONFIGURATION DATA, THE APPLICATION STANDARDS DATA, AND THE SECURITY STANDARDS DATA, THE BASE PATTERN CORRESPONDING TO A MACHINE IMAGE AND BEING EXTENDABLE TO ENABLE GENERATION OF ADDITIONAL PATTERNS THAT ARE EXTENSIONS OF THE BASE PATTERN 410, process flow proceeds to TEST THE BASE PATTERN BY GENERATING TEST CASE DATA FOR TESTING THE BASE PATTERN 412.

In one embodiment, at TEST THE BASE PATTERN BY GENERATING TEST CASE DATA FOR TESTING THE BASE PATTERN 412, the base pattern is tested by generating test case data for testing the base pattern, using any of the methods, processes, and procedures discussed above with respect to FIGS. 1-4.

In one embodiment, once the base pattern is tested by generating test case data for testing the base pattern at TEST THE BASE PATTERN BY GENERATING TEST CASE DATA FOR TESTING THE BASE PATTERN 412, process flow proceeds to END 414.

In one embodiment, at END 422 the process for generating and testing automatic patterns is exited to await new data and/or instructions.

As noted above, the specific illustrative examples discussed above are but illustrative examples of implementations of embodiments of the method or process for generating and testing automatic patterns. Those of skill in the art will readily recognize that other implementations and embodiments are possible. Therefore the discussion above should not be construed as a limitation on the claims provided below.

In one embodiment, a computing system implemented method generates and tests automatic patterns. The method includes receiving configuration data related to a cloud computing architecture, receiving application standards data related to application standards for executing applications in the cloud computing architecture, and receiving security standards data related to security standards for implementing applications with the cloud computing architecture. The method includes generating a base pattern based on the configuration data, the application standards data, and the security standards data. The base pattern corresponds to a machine image and is extendable to enable generation of additional patterns that are extensions of the base pattern. The method includes testing the base pattern by generating test case data for testing the base pattern, receiving attribute data for extending the base pattern, and generating an extended pattern by adjusting the base pattern based on the attribute data, the extended pattern corresponding to an adjusted machine image. The method includes testing the extended pattern by generating test case data for testing the extended pattern and implementing a cloud based application with the extended pattern by instantiating a virtual machine in accordance with the adjusted machine image.

In one embodiment, a system for generating and testing automatic patterns, the system includes at least one processor at least one memory coupled to the at least one processor. The at least one memory has stored therein instructions which, when executed by any set of the one or more processors, perform a process including receiving configuration data related to a cloud computing architecture, receiving application standards data related to application standards for executing applications in the cloud computing architecture, and receiving security standards data related to security standards for implementing applications with the cloud computing architecture. The process includes generating a base pattern based on the configuration data, the application standards data, and the security standards data. The base pattern corresponds to a machine image and is extendable to enable generation of additional patterns that are extensions of the base pattern. The process includes testing the base pattern by generating test case data for testing the base pattern, receiving attribute data for extending the base pattern, and generating an extended pattern by adjusting the base pattern based on the attribute data, the extended pattern corresponding to an adjusted machine image. The process includes testing the extended pattern by generating test case data for testing the extended pattern and implementing a cloud based application with the extended pattern by instantiating a virtual machine in accordance with the adjusted machine image.

One embodiment is a computing system implemented method for generating and testing an automatic pattern. The method includes receiving configuration data related to a cloud computing architecture, receiving application standards data related to application standards for executing applications in the cloud computing architecture, and receiving security standards data related to security standards for implementing applications with the cloud computing architecture. The process includes generating a base pattern based on the configuration data, the application standards data, and the security standards data. The base pattern corresponds to a machine image and is extendable to enable generation of additional patterns that are extensions of the base pattern. The method includes testing the base pattern by generating test case data for testing the base pattern.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
　receiving configuration data related to a cloud computing architecture;
　receiving application standards for executing applications in the cloud computing architecture;
　receiving security standards for implementing applications with the cloud computing architecture;
　generating a base pattern based on the configuration data, the application standards, and the security standards, the base pattern corresponding to a machine image and configured to generate additional patterns that are extensions of the base pattern;
　testing the base pattern by generating test case data;
　receiving first attribute data from a client device for extending the base pattern;
　generating an extended pattern on a server by adjusting the base pattern based on the first attribute data, the extended pattern corresponding to an adjusted machine image;
　testing the extended pattern by generating test case data; and implementing a cloud based application with the extended pattern by instantiating a virtual machine in accordance with the adjusted machine image.

2. The method of claim 1, wherein the base pattern includes an open source model.

3. The method of claim 1, wherein the extended pattern includes an open source model.

4. The method of claim 1, wherein the extended pattern is a compound of multiple base patterns.

5. The method of claim 1, wherein the base pattern identifies limits beyond which the base pattern cannot be extended.

6. The method of claim 1, wherein the base pattern is a machine image for implementing applications in an Amazon Web Services (AWS) cloud computing environment.

7. The method of claim 1, wherein the base pattern is a machine image for implementing applications in a Microsoft Azure cloud computing environment.

8. The method of claim 1, wherein the base pattern is a machine image for implementing applications in a Google Cloud cloud computing environment.

9. The method of claim 1, wherein the machine image defines an application container.

10. The method of claim 1, wherein the base pattern corresponds to a cloud computing infrastructure.

11. The method of claim 1, wherein the base pattern defines an application stack.

12. The method of claim 1, wherein the base pattern defines multiple operating systems that can be utilized with the machine image.

13. The method of claim 1, wherein executing an application with the base pattern instantiates one or more virtual machines.

14. The method of claim 1, wherein the base pattern identifies, as components of the machine image, one or more of:
   processing resources;
   storage resources;
   server resources; and
   operating system resources.

15. The method of claim 1, wherein the extended pattern corresponds to a microservice.

16. The method of claim 1, wherein the base pattern corresponds to a machine image for providing cloud based data management service applications.

17. The method of claim 16, wherein the data management service applications include financial management service applications.

18. The method of claim 17, wherein the financial management service applications include one or more of:
   tax return preparation applications;
   budgeting applications;
   bookkeeping applications; and
   financial transaction tracking applications.

19. The method of claim 1, further comprising updating the security standards of the base pattern.

20. The method of claim 19, wherein updating the security standards of the base pattern updates security standards of the extended pattern.

21. The method of claim 1, further comprising maintaining a pattern database including multiple base patterns and extended patterns that are extensions of the multiple base patterns.

22. The method of claim 21, wherein the pattern database includes lineage data identifying lineal relations between extended patterns and between extended patterns and base patterns.

23. The method of claim 22, wherein updating a respective base pattern in the pattern database causes all extended patterns that descend from the respective base pattern to be updated.

24. The method of claim 1, further comprising:
   receiving second attribute data for extending the extended pattern; and
   generating a second extended pattern by adjusting the extended pattern based on the second attribute data.

25. The method of claim 24, wherein updating the base pattern causes the adjusted pattern and the second extended pattern to be updated.

26. The method of claim 24, wherein updating the extended pattern causes the second extended pattern to be updated.

27. A method performed by one or more processors of a system, the method comprising:
   receiving configuration data related to a cloud computing architecture;
   receiving application standards for executing applications in the cloud computing architecture;
   receiving security standards for implementing applications with the cloud computing architecture;
   generating a base pattern based on the configuration data, the application standards, and the security standards, the base pattern corresponding to a machine image and configured to generate additional patterns that are extensions of the base pattern; and
   testing the base pattern by generating test case data.

28. The method of claim 27, further comprising:
   receiving attribute data from a client device for extending the base pattern;
   generating an extended pattern on a server by adjusting the base pattern based on the attribute data, the extended pattern corresponding to an adjusted machine image; and
   testing the extended pattern by generating test case data.

29. The method of claim 28, further comprising updating the security standards of the base pattern.

30. The method of claim 29, wherein updating the security standards of the base pattern updates security standards of the extended pattern.

31. A system comprising:
   at least one processor; and
   at least one memory storing instructions that, when executed by the at least one processor, cause the system to:
   receive configuration data related to a cloud computing architecture;
   receive application standards for executing applications in the cloud computing architecture;
   receive security standards for implementing applications with the cloud computing architecture;
   generate a base pattern based on the configuration data, the application standards, and the security standards, the base pattern corresponding to a machine image and configured to generate additional patterns that are extensions of the base pattern;
   test the base pattern by generating test case data;
   receive first attribute data from a client device for extending the base pattern;
   generate an extended pattern on a server by adjusting the base pattern based on the first attribute data, the extended pattern corresponding to an adjusted machine image;
   test the extended pattern by generating test case data; and implement a cloud based application with the extended pattern by instantiating a virtual machine in accordance with the adjusted machine image.

32. The system of claim 31, wherein the base pattern includes an open source model.

33. The system of claim 31, wherein the extended pattern includes an open source model.

34. The system of claim 31, wherein the extended pattern is a compound of multiple base patterns.

35. The system of claim 31, wherein the base pattern identifies limits beyond which the base pattern cannot be extended.

36. The system of claim 31, wherein the base pattern is a machine image for implementing applications in an Amazon Web Services (AWS) cloud computing environment.

37. The system of claim 31, wherein the base pattern is a machine image for implementing applications in a Microsoft Azure cloud computing environment.

38. The system of claim 31, wherein the base pattern is a machine image for implementing applications in a Google Cloud cloud computing environment.

39. The system of claim 31, wherein the machine image defines an application container.

40. The system of claim 31, wherein the base pattern corresponds to a machine image for providing cloud based data management service applications.

41. The system of claim 40, wherein the data management service applications include financial management service applications.

42. The system of claim 41, wherein the financial management service applications include one or more of:
- tax return preparation applications;
- budgeting applications;
- bookkeeping applications; and
- financial transaction tracking applications.

43. The system of claim 31, wherein execution of the instructions further causes the system to update the security standards of the base pattern.

44. The system of claim 43, wherein updating the security standards of the base pattern updates security standards of the extended pattern.

45. The system of claim 31, wherein execution of the instructions further causes the system to maintain a pattern database including multiple base patterns and extended patterns that are extensions of the multiple base patterns.

46. The system of claim 45, wherein the pattern database includes lineage data identifying lineal relations between extended patterns and between extended patterns and base patterns.

47. The system of claim 46, wherein updating a respective base pattern in the pattern database causes all extended patterns that descend from the respective base pattern to be updated.

48. The system of claim 31, wherein execution of the instructions further causes the system to:
- receive second attribute data for extending the extended pattern; and
- generate a second extended pattern by adjusting the extended pattern based on the second attribute data.

49. The system of claim 48, wherein updating the base pattern causes the adjusted pattern and the second extended pattern to be updated.

50. The system of claim 48, wherein updating the extended pattern causes the second extended pattern to be updated.

51. The system of claim 31, wherein execution of the instructions further causes the system to prohibit generation or instantiation of the extended pattern if the extended pattern does not comply with configuration and security standards of the base pattern.

52. The system of claim 51, wherein execution of the instructions further causes the system to test the extended pattern at creation of the extended pattern, upon instantiating the extended pattern, and while an instance of the extended pattern is running.

* * * * *